United States Patent [19]

Williams

[11] 4,100,891

[45] Jul. 18, 1978

[54] ELECTRONIC FUEL INJECTION CONTROL SYSTEM

[75] Inventor: Elmer A. Williams, San Angelo, Tex.

[73] Assignee: Rockwell International Corporation, El Segundo, Calif.

[21] Appl. No.: 495,359

[22] Filed: Aug. 7, 1974

[51] Int. Cl.$^2$ .............................................. F02B 3/00
[52] U.S. Cl. ........................... 123/32 EB; 123/119 A; 123/179 G
[58] Field of Search ......... 123/32 EA, 114 A, 179 G, 123/198 DB, 117 D, 32 EB, 32 EC

[56] References Cited

U.S. PATENT DOCUMENTS

| | | | |
|---|---|---|---|
| 2,924,209 | 2/1960 | Schott | 123/198 DB |
| 3,614,945 | 10/1971 | Schlaomuller et al. | 123/179 G |
| 3,656,465 | 4/1972 | Frankle | 123/179 G |
| 3,683,871 | 8/1972 | Barr et al. | 123/179 G |
| 3,696,303 | 10/1972 | Hartig | 123/32 EA |
| 3,702,601 | 11/1972 | Gordon et al. | 123/32 EA |
| 3,734,067 | 5/1973 | Glockner et al. | 123/32 GA |
| 3,757,755 | 9/1973 | Carner | 123/32 EA |
| 3,783,847 | 1/1974 | Kolody | 123/119 A |
| 3,797,465 | 3/1974 | Hobo et al. | 123/179 G |
| 3,809,029 | 5/1974 | Wakamatso et al. | 123/32 EA |
| 3,816,717 | 6/1974 | Yoshida et al. | 123/32 EA |
| 3,827,417 | 8/1974 | Morita | 123/187.5 R |
| 3,831,563 | 8/1974 | Brittian et al. | 123/32 EA |
| 3,835,819 | 9/1974 | Anderson | 123/32 EA |
| 3,858,561 | 1/1975 | Aono | 123/32 EA |
| 3,895,611 | 7/1975 | Enoo et al. | 123/32 EA |

OTHER PUBLICATIONS

M. Williams, "Electronic Fuel Injection Reduces Automotive Pollution", Electronics, Sep. 11, 1972, pp. 121-125, vol. 45, No. 19.

Primary Examiner—Ronald B. Cox
Attorney, Agent, or Firm—L. Lee Humphries; Charles T. Silberberg

[57] ABSTRACT

A timing signal generator operates in response to engine position sensors to generate pulse signals in sequence, the leading edge of each of said pulses essentially coinciding with the valve opening time of an associated one of the cylinders of an internal combustion engine. The outputs of the timing signal generator are fed to a control signal generator which generates a series of pulses, one for each of the engine cylinders, the leading edges of these pulses each approximately coinciding with the leading edge of a corresponding one of the timing signal generator outputs. The pulse widths of the outputs of the control signal generator, which are controlled in accordance with various engine parameters, are indicative of engine fuel requirements for optimum engine efficiency and/or minimum emission of pollutants. The pulse signal outputs of the control signal generator are each used to control a respective one of the fuel injectors for the engine to provide fuel to each of the cylinders at the proper time and for a time duration which is precisely in accordance with engine requirements.

26 Claims, 8 Drawing Figures

ELECTRONIC FUEL INJECTION CONTROL SYSTEM

This invention relates to electronic fuel injection control systems, and in the preferred embodiment to such a system utilizing digital circuitry in its implementation.

Electronically controlled fuel injection systems have been proposed as an approach to minimizing engine exhaust pollution and optimizing the use of fuel, both of which objectives have widespread interest at the present time. Various approaches to electronic fuel injection have been suggested. Many of these prior art systems utilize analog techniques for generating the fuel injector control signals. Such analog systems generally lack the inherent accuracy of digital systems. Further, digital systems have the advantage of lending themselves to fabrication with integrated circuitry which makes for highly compact and economical construction as compared with analog circuitry. Certain digital fuel injection control systems of the prior art utilize a programmed digital memory which carries programmed information for the particular engine with which this system is utilized. This, of course, requires a separate memory for each type of engine with its obvious drawbacks. Other digital systems of the prior art of which Applicant is aware fail to optimize the control functions as does the system of the present invention.

The system of the present invention overcomes the aforementioned shortcomings of the prior art in utilizing a highly efficient digital implementation which lends itself to construction with integrated circuitry. Further, the system of the invention can be utilized with any engine, and there is no programmed information unique to a particular engine needed for its operation. Further, the system of the invention in the preferred embodiment takes into account a number of parameters not generally considered in prior art systems, such as recirculation of the exhaust gas to minimize nitric oxide emission, a fuel pump control to avoid the feeding of fuel to the injectors if the engine should fail to properly start, a cold start enrichment to provide additional fuel to the fuel injectors when the engine is cold, and a hot start enrichment to stabilize the fuel supply to the engine when the engine is hot.

It is therefore an object of this invention to provide a highly accurate fuel injection control system which operates in response to measured engine parameters without the use of a program.

It is a further object of this invention to provide an economical and compact fuel injection control system.

It is a further object of this invention to provide a digital fuel injection control system which lends itself to construction with integrated circuitry.

Other objects of the invention will become apparent as the description proceeds in connection with the accompanying drawings, of which.

Briefly described, the system of the invention is as follows:

A timing signal generator which may include a digital sequencer receives pulses indicative of the valve opening time of each of the cylinders in sequence, these pulse signals being generated by sensors operating in conjunction with an engine position transducer. The timing signal generator output, which is a series of pulses appearing in sequence on separate lines as a function of the valve opening time of each of the engine cylinders, is fed to a control signal generator which includes a control circuit for controlling the fuel injection for each of the cylinders. The control signal generator utilizes the leading edge of each of the pulses received from the timing signal generator to initiate the fuel injection for a respective associated cylinder.

Data related inversely both to engine intake manifold vacuum and to engine temperature is sensed by appropriate transducers and processed in an analog data generator to develop an analog signal in accordance with these measured parameters. This analog signal is converted to a digital signal in an analog to digital data converter, this digital signal being placed into a storage register which is periodically updated with information representing the current status of the output of the analog data generator. The analog-digital conversion and updating of the information occurs independent of engine timing at a rate which is typically 1-8 times for the firing of each cylinder. The output of the storage register is fed to control circuits for each of the fuel injectors in the control signal generator, where it is utilized to control the pulse width of the fuel injection control signal. The fuel injection control signal for each of the cylinders is utilized to control the fuel injection thereof, the duration of such fuel injection being inversely proportional both to the engine intake manifold vacuum and to engine temperature. Means are further provided to de-energize the fuel pump to terminate fuel injection should the engine not be started up a predetermined time period after the timing cycle has been initiated. Further, control circuits are provided to increase the fuel supply to the engine when it is cold on starting (cold start enrichment) and to augment the fuel supply by a fixed amount on hot engine starts (hot start enrichment). Also, recirculation of the exhaust gas from the engine exhaust to the engine intake manifold is provided when engine temperature reaches a predetermined magnitude provided the transmission is in high gear and manifold vacuum and engine RPM are within predetermined values.

Figure 1:
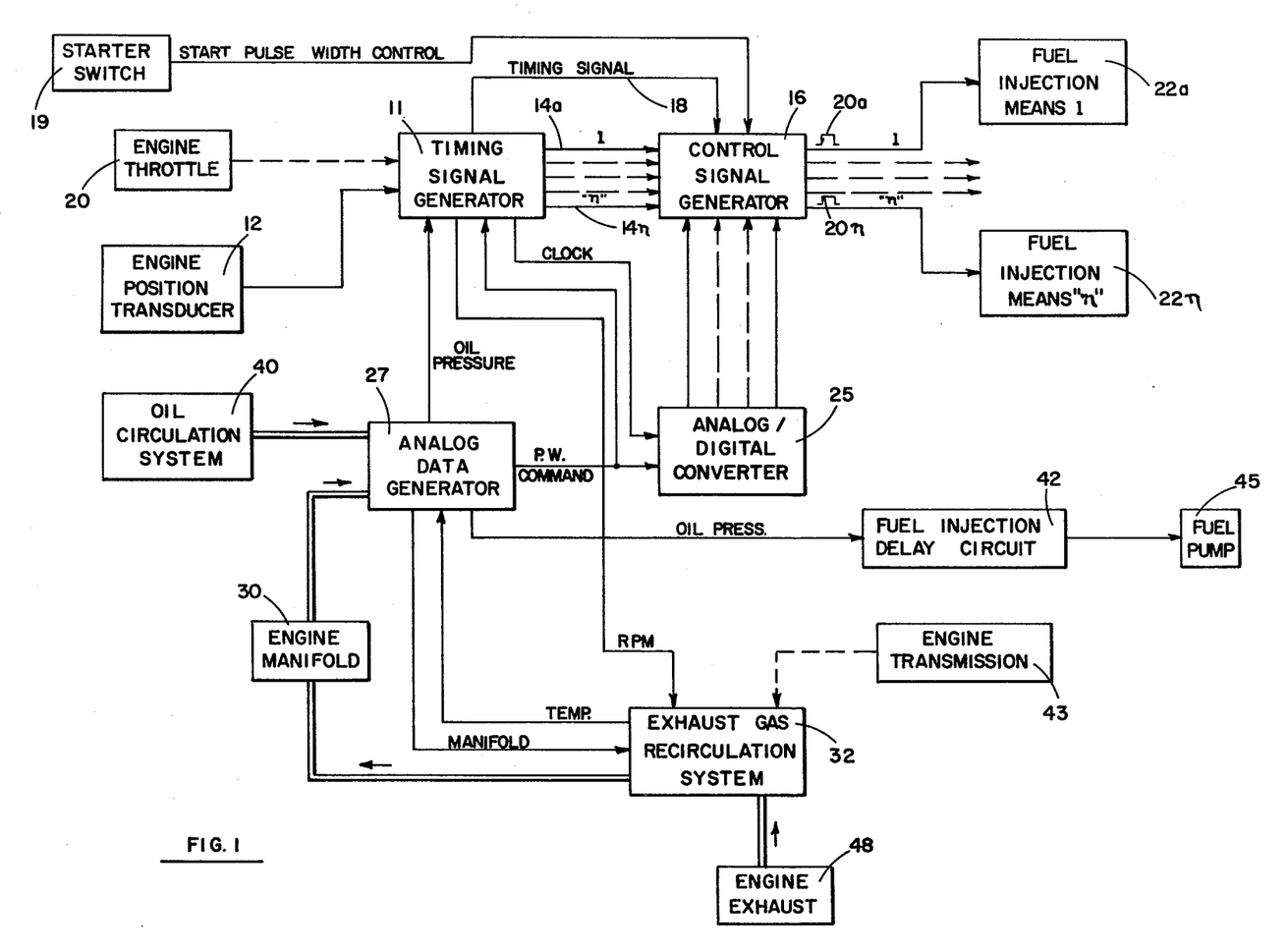
FIG. 1 is a functional block diagram of the system of the invention.

Referring now to FIG. 1, a functional block diagram of the system is shown. Timing signal generator 11 receives input pulses from the engine position transducer 12, each of these pulses representing the time when one of the cylinders fires and the valve on another of the cylinders opens. The opening of each cylinder valve is the event of interest, and the pulses received from engine position transducer 12 are correlated with this function for each of the cylinders such that the timing signal generator provides sequential outputs on lines 14a–14n indicative of the time at which each of the cylinder valves opens in succession. These pulse outputs are fed to control signal generator 16. A timing signal is also fed from timing signal generator 11 to control signal generator 16 on line 18, to clock the circuits of the control signal generator so that they are precisely synchronized with the signal sensed from the engine position transducer. Timing signal generator 11 also is mechanically coupled to engine throttle 20 and in response to actuation of the throttle generates a series of pulses. These pulses are utilized to provide output signals to the control signal generator to prime the engine prior to starting. Once the engine has started, the signals from the engine throttle are no longer utilized by the timing signal generator.

Control signal generator 16 has a series of pulse outputs 20a–20n which are used in controlling the operation of associated fuel injection means 22a–22n respectively. The leading edge of each of pulses 20a–20n corresponds approximately to the time at which an associated one of the cylinder valves opens and thus provides initiation of fuel injection at this time. The width of each of pulses 20a–20n controls the duration of fuel injection for each of the valves, this pulse width and thus the time of fuel injection being in accordance with the output signal fed from analog/digital converter 25 to control signal generator 16. Analog/digital converter 25 generates this control signal in response to a pulse width command signal received from analog data generator 27. Analog data generator 27 generates this pulse width command signal in response to data indicative of engine temperature and intake manifold vacuum. Thus, analog data generator 27 includes a transducer for measuring the vacuum in engine manifold 30. A signal inversely proportional to engine temperature is fed to analog data generator 27 from exhaust gas recirculation system 32.

A signal is provided from starter switch 19 to control signal generator 16. This signal operates to override the normal operation of the control signal generator and causes it to have a fixed predetermined pulse width output during the time the starter switch is closed, thus assuring an adequate fuel supply to the engine while it is being "cranked".

Analog generator 27 also includes a tranducer which measures the pressure in the engine oil circulation system 40, the output of this transducer being used as an indicia of whether or not the engine is operating. Alternatively, a transducer which measures engine RPM could be used. This oil pressure signal indicative of whether or not the engine is operating is utilized in the analog data generator 27 and is also fed to timing signal generator 11 and fuel injection delay circuit 42 for use as to be explained further on in the specification.

Fuel injection delay circuit 42 is used to control the operation of the engine fuel pump 45. Fuel injection delay circuit 42 operates to abort operation of the fuel pump in the event that the engine does not start up within a predetermined time after the ignition switch is actuated, thus avoiding wastage of gas and lessening the emission of pollutants.

Exhaust gas recirculation system 32 operates to recirculate gas from engine exhaust 48 to engine intake manifold 30 when engine temperature is above a predetermined point, predetermined conditions of manifold vacuum and engine RPM exist, and the transmission is in high gear. This last mentioned condition is indicated by a signal fed to system 32 from the engine transmission 43. Under these conditions the recirculation of the exhaust gas operates to reduce peak combustion temperature to lessen $NO_x$ emissions.

Figure 2:
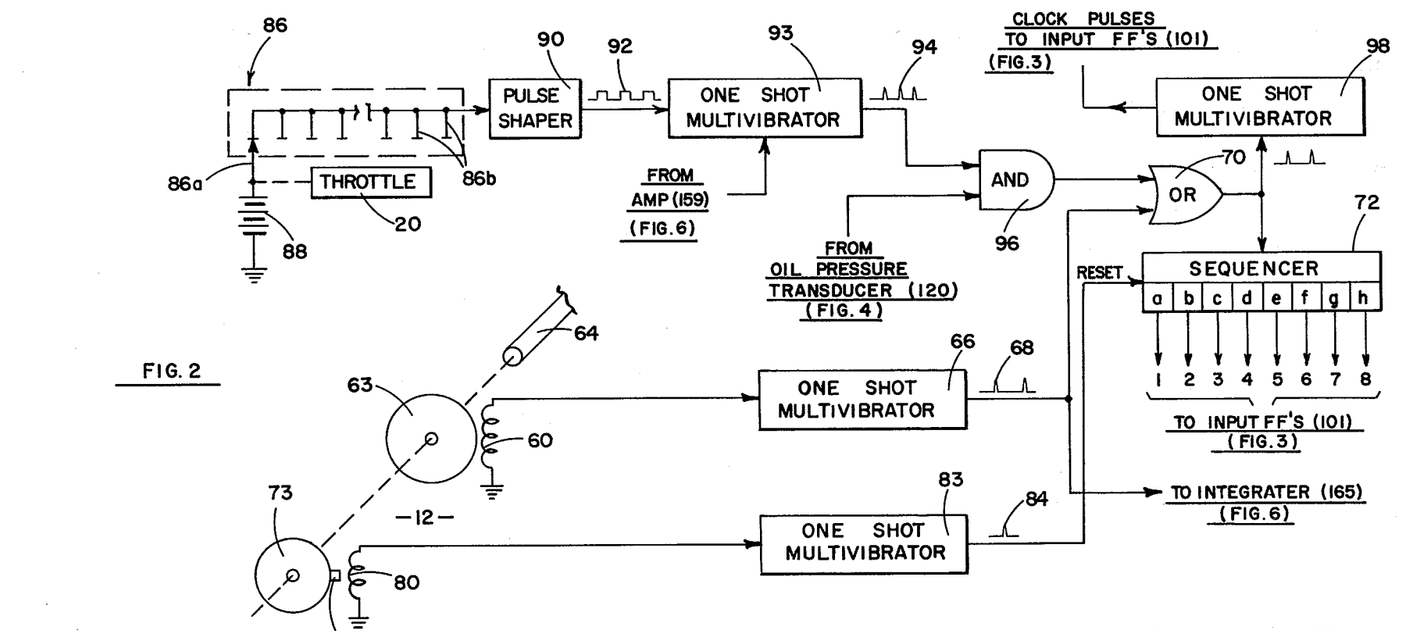
FIG. 2 is a functional schematic of a preferred embodiment of a timing signal generator which may be utilized in the system of the invention.

Referring now to FIG. 2, a preferred embodiment of the timing signal generator of the invention is schematically illustrated. Pickoff coil 60 is positioned in proximity to engine distributor 63 and develops a pulse signal as each of the cylinder firing voltages passes through the distributor, as the engine crank shaft 64 rotates, these pulses being indicative of engine position. The pulse signals are fed from pickoff winding 60 to one-shot multivibrator 66 which develops a series of uniform narrow pulses 68 in response to the leading edge of the sensed pulse. The output pulses 68 are fed through OR gate 70 as an input drive to sequencer 72. Sequencer 72, which may comprise a shift register, sequentially provides outputs from stages a–h in response to the input pulses received thereby.

Mechanically coupled to distributor 63 is a rotor member 73 which has a single tooth 73a projecting therefrom. The rotational position of rotor member 73 is adjusted so that tooth 73a arrives opposite pickup coil 80 at a time during each rotation of the distributor which corresponds to a time immediately prior to when the valve for the No. 1 cylinder of the engine is opened. The pulses generated in pickoff coil 80 are fed to one-shot multivibrator 83 which generates narrow pulses 84 corresponding to the leading edge of the sensed pulses, pulses 84 being utilized to reset sequencer 72. In this manner, the operation of the sequencer is synchronized so that the control pulse for the fuel injector for cylinder 1 occurs at the proper time at sequencer output "a" and all the other cylinder fuel injection control signals likewise appear at the proper time. It is to be noted that for proper operation it is necessary that the sequencer be reset between the time that the output appears from stage "h" of the sequencer and stage "a" of the sequencer. It thus should be apparent that synchronizer wheel 73 can be adjusted to produce this end result.

Prior to the starting of the engine, priming is provided in the following manner: Coupled to the engine throttle 20 is a wiper contact switch 86 which has a slidable contact arm 86a which successively contacts stationary contacts 86b as the throttle is moved. A DC power source 88 is connected to contact arm 86a. Thus, as the contact arm 86a wipes across the stationary contacts 86b, a series of pulses is generated. These pulses are shaped so that they take on a rectangular waveform by means of pulse shaper 90. The rectangular output pulses 92 of the pulse shaper are fed to one-shot multivibrator 93 which produces narrow output pulses 94 which are synchronized with the leading edges of pulses 92. Pulses 94 are fed to AND gate 96. AND gate 96 also receives an input from oil pressure transducer 120 (FIG. 4). When the oil pressure transducer is indicating no oil pressure, a "1" output is fed therefrom to AND gate 96 permitting the passage of pulses 94 therethrough to OR gate 70. At such times, pulses are thus provided through to the sequencer to effect the operation thereof so as to provide priming fuel to the engine. Once, however, the engine has started the output of the oil pressure transducer goes to "0" and thus inhibits AND gate 96 from passing pulses 94 therethrough, such that the sequencer is operated in response to pulses 68. The output of OR gate 70 is also fed to one-shot multivibrator 98 which provides clock pulses to the input flipflops of the control signal generator (FIG. 3), as now to be explained. One-shot multivibrator 93 receives a control signal from amplifier 159 (FIG. 6), this signal being in accordance with engine temperature. When the engine is above a predetermined temperature, this signal operates to inhibit the operation of the multivibrator to prevent priming of the engine.

Figure 3:
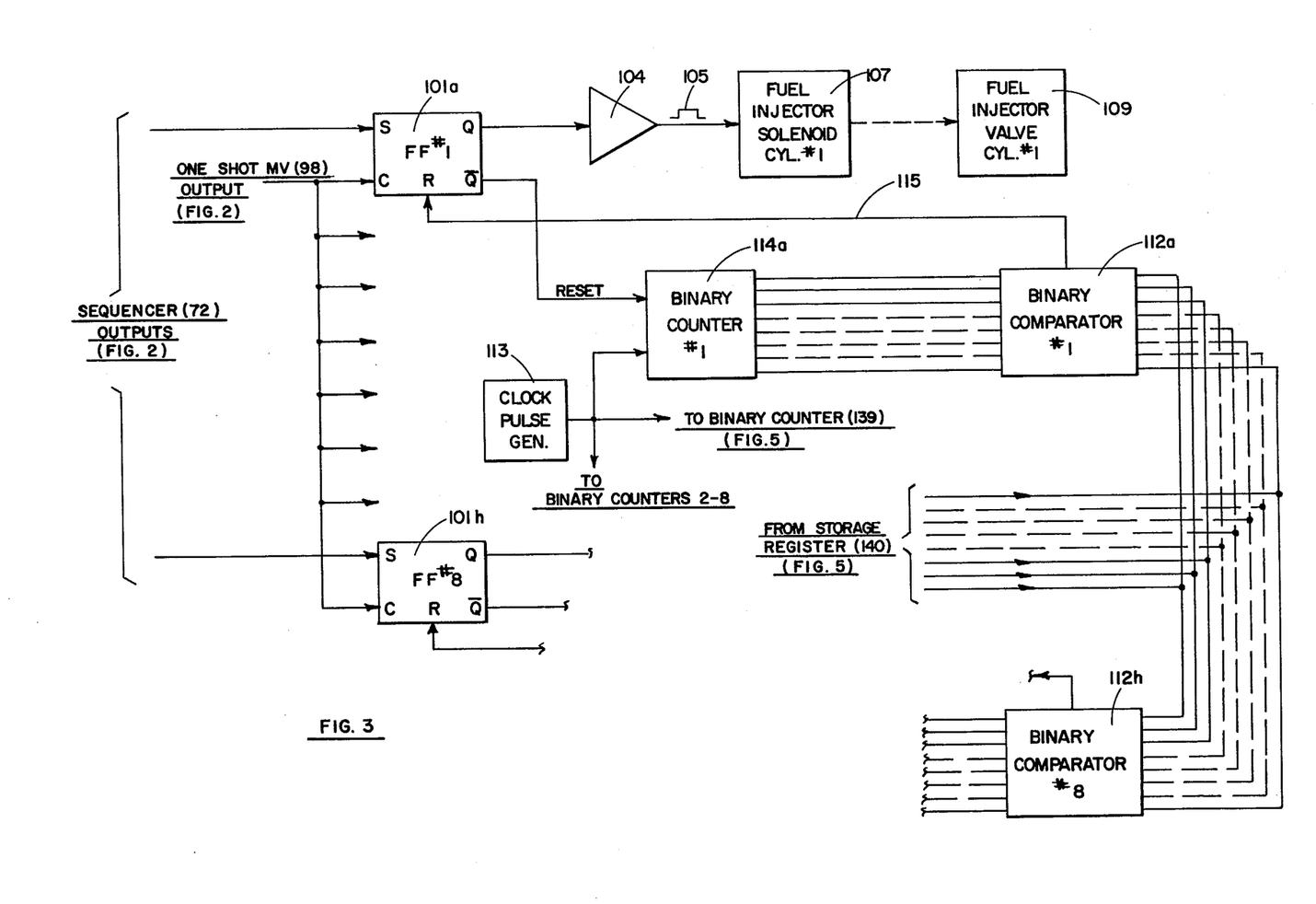
FIG. 3 is a functional schematic of a preferred embodiment of a control signal generator which may be utilized in the system of the invention.
Figure 4:
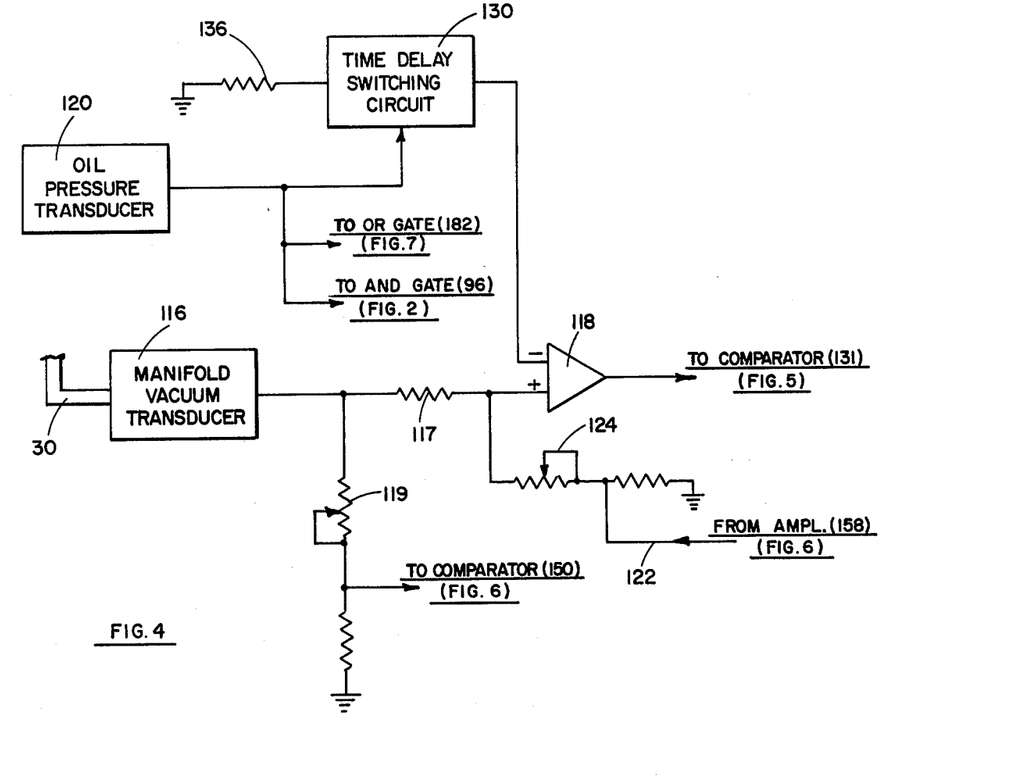
FIG. 4 is a schematic drawing of a preferred embodiment of an analog data generator which may be utilized in the system of the invention.
Figure 5:
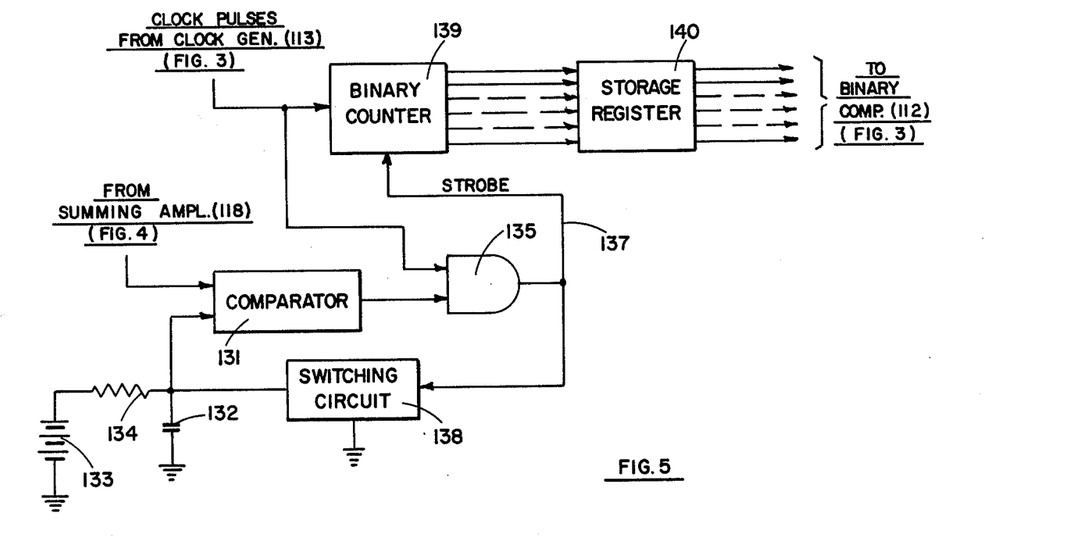
FIG. 5 is a schematic drawing of a preferred embodiment of an analog/digital data converter which may be utilized in the system of the invention.

Referring now to FIG. 3, a preferred embodiment of the control signal generator of the invention is schematically illustrated. The sequential outputs of sequencer 72 (FIG. 2) are each fed to the "set" input of a respective one of flipflops 101a–101h. For convenience of illustration, only one of the fuel injector control channels is shown in its entirety but it is to be understood that the control channels for each of the other cylinders is identical to that shown for cylinder No. 1. The output of one-shot multivibrator 98 (FIG. 2) is fed to each of the "clock" imputs of flipflops 101a–101h. When flipflop 101a is set, the "Q" output of the flipflop has an output which is amplified by amplifier 104 to produce a control pulse 105. The leading edge of control pulse 105 operates to initiate the operation of fuel injector solenoid 107 which in turn opens fuel injector valve 109. The duration of control pulse 105 is determined by the length of time that flipflop 101a is in its "set" state. The flipflop is reset by a signal fed thereto from binary comparator 112a. Binary comparator 112a receives a binary coded signal from storage register 140 of the analog/digital data converter (FIG. 5). This binary coded signal represents the pulse width command developed in analog data generator 27 in accordance with intake manifold vacuum and engine temperature.

Clock pulse generator 113 drives binary counter 114a, the binary coded output of binary counter 114a being fed to binary comparator 112a for comparison with the input thereto from the storage register. When the count in binary counter 114 reaches that fed to the binary comparator from the storage register, a coincidence signal is generated on line 115, this signal being utilized to reset flipflop 101a. This reset signal thus determines the width of pulse 105 and the time duration of fuel injection for cylinder No. 1.

The fuel injection for each of the other cylinders is controlled in precisely the same manner, in sequence, there being a flipflop, binary counter and binary comparator for each of the cylinders. As indicated in FIG. 3, the outputs of the storage register are commonly fed to all of the binary comparators, the output of clock pulse generator 113 is fed to all of the binary counters and the output of one-shot multivibrator 98 (FIG. 2) is used to provide clock pulses for all of the flipflops.

Figures 6, 8:
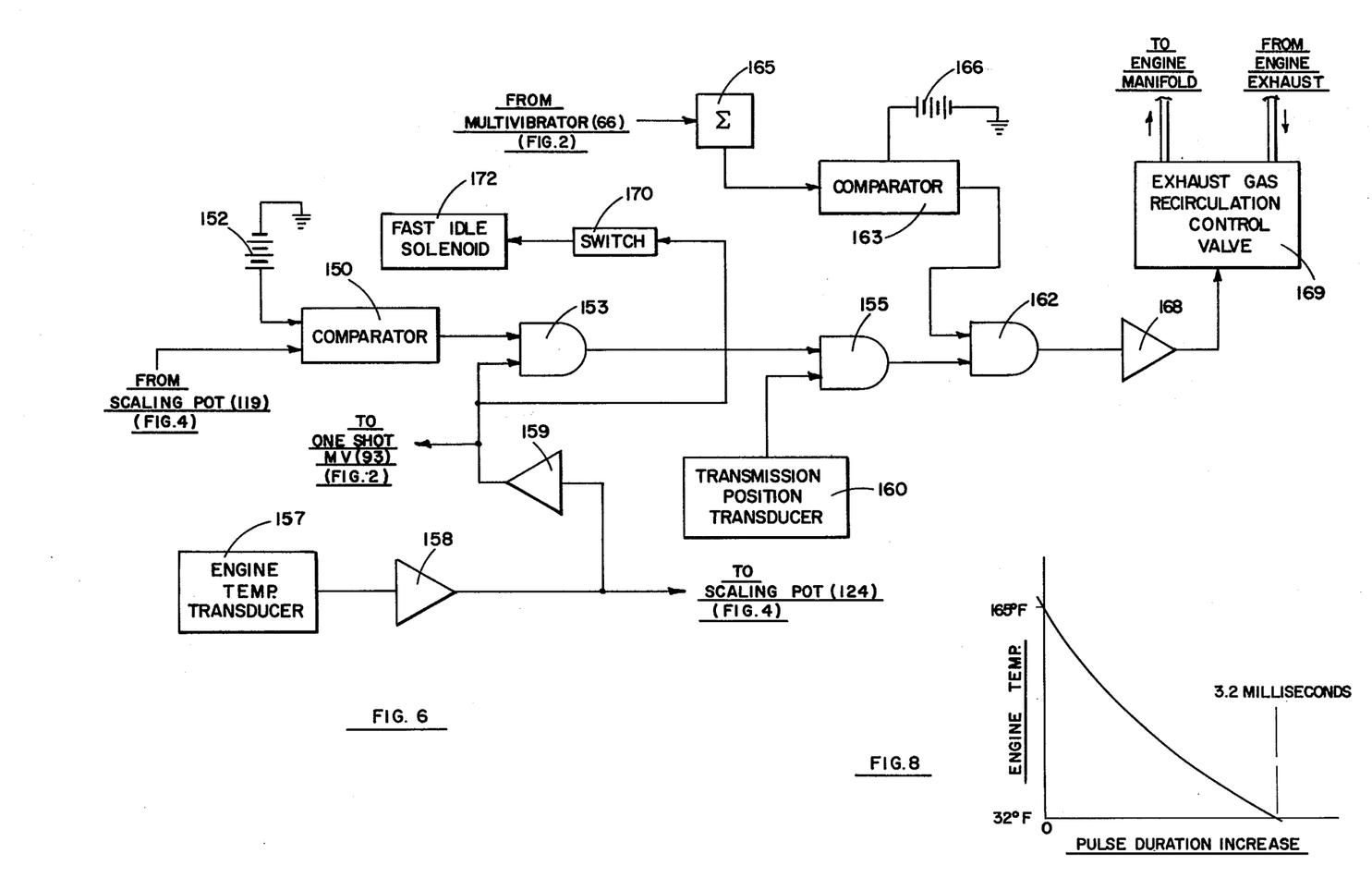
FIG. 6 is a schematic of a preferred embodiment of an exhaust gas recirculation control which may be utilized in the system of the invention.
FIG. 8 is a graph illustrating pulse duration increase v. engine temperature in a typical embodiment of the invention.

Referring now to FIG. 4, a preferred embodiment of the analog data generator of the invention is schematically illustrated. An electrical signal in accordance with the vacuum in intake manifold 30 is generated by means of manifold vacuum transducer 116. This signal is fed through resistor 117 to summing amplifier 118. Also fed as an input to summing amplifier 118 in additive relationship to the output of transducer 116 is a signal fed on line 122 which is a signal inversely proportional to engine temperature which may be derived from the temperature of the engine block or coolant. This signal is scaled by means of scaling potentiometer 124 and provides a cold start enrichment function, i.e., when the engine is cold it operates to increase the duration or pulse width of the injection control pulse 105, and thus the period of fuel injection. The increase in pulse duration for lower and lower engine temperatures becomes less and less, and at a predetermined engine temperature no further increases in pulse width are provided for temperatures below that temperature. FIG. 8 illustrates such operation for a particular engine where, as can be seen, a maximum increase in pulse width of 3.2 milliseconds is provided at an engine temperature of 32° F. It is to be noted that these parameters will be different for each particular engine.

The circuitry including time delay switching circuit 130 functions to provide hot start enrichment, i.e., it augments the injection of fuel by a fixed amount when the engine is hot at the time it is started. With a hot engine, the pulse width control signal, in view of the signal fed to amplifier 118 from potentiometer 124 tends to provide a shorter duration. Time delay switching circuit 130 operates to affect the operation of amplifier 118 to augment this pulse width by a fixed amount during a fixed period immediately after the engine is started (as indicated by an output from oil pressure transducer 120). Thus the negative line for the amplifier is connected through switching circuit 130, this line being grounded through switching circuit 130 and resistor 136 with the actuation of the switching circuit for a predetermined period after oil pressure transducer 120 indicates proper engine oil pressure. The duration of this time period is determined by the delay built into the circuit 130. In this manner, the injection of fuel by the precisely timed control circuit is augmented by a fixed amount until the engine is running stably. As already noted, priming fuel to start the engine is provided from the throttle linked control described in connection with FIG. 2. The analog pulse width command signal is fed from amplifier 118 to comparator 131 of the analog/digital data converter (FIG. 5). It is to be noted that during priming, the vacuum of the intake manifold is zero and thus a maximum pulse duration is provided by virtue of the signal input to amplifier 118.

Referring now to FIG. 5, a preferred embodiment of the analog/digital data converter of the invention is schematically illustrated. The analog signal representing pulse width command (i.e., the time of fuel injection), is fed to comparator 131. Also fed to comparator 131 for comparison with the analog input is the voltage across capacitor 132. Capacitor 132 is charged by means of DC power source 133 which is connected to the capacitor by resistor 134. When the voltage across capacitor 132 reaches the level of the voltage fed to the comparator from summing amplifier 118, comparator 131 provides a "1" output signal to AND gate 135. AND gate 135 also receives clock pulses from clock pulse generator 113 (FIG. 3). Thus, with a coincidence ("1") signal at the output of comparator 131, the next clock pulse to arrive at the input of AND gate 135 is passed through the gate to produce a "strobe" pulse on line 137. This strobe pulse operates to actuate switching circuit 138 for a long enough period to enable full discharge of capacitor 132. This strobe pulse also operates to reset binary counter 139 and immediately prior to reset to shift the count therein to storage register 140. Thus it can be seen that binary counter 139 commences to count the clock pulses fed thereto as soon as coincidence is reached between the voltage across capacitor 132 and the pulse width control signal fed to the comparator from summing amplifier 118. The count in binary counter 139 will be proportional to the magnitude of the analog pulse width control signal fed to the comparator; for the time that it takes for capacitor 132 to charge to the pulse width control voltage will determine the pulse count of binary counter 139 up to the time the counter is reset.

Typically in an eight-cylinder engine, an update of the pulse width control signal is provided from 1-8 times each time a cylinder fires (depending on engine RPM). Information updating occurs independent of engine timing at time intervals dependent, among other factors, upon the time constant of the RC charge circuit formed by capacitor 132 and resistor 134. The updating period can be varied by making resistor 134 variable.

It is to be noted that storage register 140 thus receives updated information from the binary counter at relatively short intervals. The binary coded output of storage register 140 is fed to the binary comparators of FIG. 3 for use in generating the fuel injector control signal, as already described.

It is also to be noted that while the illustrative embodiment is shown for operation with an eight-cylinder engine, that operation with any number of cylinders can be achieved in like manner by appropriately changing the number of fuel injection control channels provided, as suggested in the discussion in connection with FIG. 1.

Referring now to FIG. 6, a preferred embodiment of an exhaust gas recirculation circuit which may be used in the system of the invention is illustrated. As already noted, the exhaust gas recirculation circuit is utilized to recirculate gas from the engine exhaust to the engine intake manifold to lessen $NO_x$ emissions by reducing peak combustion temperature. This function is only operative when predetermined conditions of engine temperature, engine transmission position, engine RPM and intake manifold vacuum are simultaneously present.

A signal in accordance with intake manifold vacuum is fed to comparator 150 from scaling potentiometer 119 of the analog data generator (FIG. 4). This signal which is appropriately scaled by means of the potentiometer to provide a signal in accordance with predetermined operating parameters, is compared with a predetermined DC voltage from DC voltage source 152. When coincidence is reached between the two signals, a "1" is fed from the comparator to AND gate 153. A signal in accordance with engine temperature is also fed to AND gate 153, this signal being provided from engine temperature transducer 157 through amplifier stages 158 and 159, which provide a non-inverted signal from the transducer to the AND gate. With the intake manifold vacuum signal at or above the reference voltage provided by voltage source 152, comparator 150 provides a gating signal to gate 153 which permits the passage of the output of amplifier 159 through the gate to AND gate 155. A gating signal is provided, to permit the passage of the temperature signal through gate 155, from the temperature tranducer 157 when the transmission is in high gear. The output of AND gate 155 is fed to AND gate 162 which is gated by the output of comparator 163. Comparator 163 provides a gating signal to AND gate 162 when the RPM of the engine is at or above a certain value, this being a further criterion for the operation of exhaust gas recirculation. Comparator 163 receives a voltage in accordance with engine RPM from integrator 165 which integrates the pulse output of one-shot multivibrator 66 (FIG. 2), this pulse output being in accordance with the speed of distributor rotation and thus RPM of the engine. When the output of integrator 165 reaches the voltage output of DC source 166, comparator 163 provides a "1" output for gating AND gate 162, thereby permitting the output of gate 155 to pass therethrough to amplifier 168.

The output of amplifier 168 operates to control exhaust gas recirculation control valve 169, operating to open this valve in response to the signal output of gate 162, thereby permitting the recirculation of the exhaust gas. It thus can be seen that exhaust gas recirculation is initiated when engine temperature has reached a particular point and intake manifold vacuum, engine RPM are above a certain magnitude as well as the transmission being in high gear.

The fast idle solenoid operates to control fast idling of the engine when a signal from temperature transducer 157 flows through amplifier 158 and 159 and is at a level in accordance with predetermined operating parameters.

Figure 7:
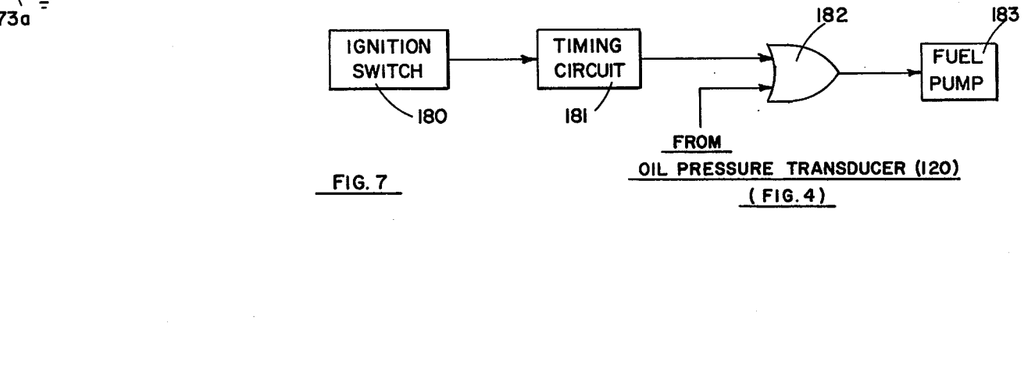
FIG. 7 is a schematic of a preferred embodiment of a fuel injection delay circuit which may be utilized in the system of the invention.

Referring now to FIG. 7, a preferred embodiment of the fuel injection delay circuit of the invention is illustrated. This circuit aborts operation of the fuel pump if the engine is not operative in a predetermined time period after the ignition switch is turned on. Ignition switch 180 is connected to initiate the timing operation of timing circuit 181. When the timing circuit operation is initiated, and up until its timing cycle has been completed, a control signal is fed from timing circuit 181 through OR gate 182 to permit the operation of fuel pump 183. At the end of this timing period the timing circuit is no longer effective to achieve this end result. However, also fed to OR gate 182 is a signal from oil pressure tranducer 120 (FIG. 4). In the event that the engine is operating by the end of the timing cycle, the signal from the oil pressure transducer will operate to continue the operation of fuel pump 183. However, in the event that the engine is not operative at the end of this timing cycle, this will be indicated by no oil pressure such that there will be no signal from the oil pressure transducer to enable the operation of the fuel pump. In this manner, the wasteful and pollutant producing injection of excess fuel into the cylinders is avoided.

The system of the invention thus operates to digitally provide separate fuel injection control signals for each of the engine cylinders which initiate injection at precisely the proper moment and continue such fuel injection for an optimum period of time in accordance with the measured engine requirements. Ancillary functions to further improve engine efficiency and minimize pollution are provided by fuel pump control and exhaust gas recirculation circuits.

While the invention has been described and illustrated in detail, it is to be clearly understood that this is intended by way of illustration and example only and is not to be taken by way of limitation, the spirit and scope of this invention being limited only by the terms of the following claims.

I claim:

1. An electronic system for controlling fuel injection into the cylinders of an internal combustion engine comprising:

timing signal generator means for generating a series of pulses in sequence, the leading edge of each of said pulses corresponding to the opening of the intake valve of one of the engine cylinders respectively, means for generating a digital pulse count signal which varies with preselected engine parameters comprising means for generating a voltage having a magnitude inversely proportional to intake manifold vacuum, means for generating a voltage having a magnitude inversely proportional to engine temperature means for summing said voltages to provide a single analog signal, analog/digital converter means for converting said analog signal to a digital signal, and storage means for storing said digital signal, said analog/digital converter means including means for periodically generating an updated digital signal in accordance with a more current value of the analog signal and providing said updated signal to said storage means, and control signal generator means responsive to the outputs of said timing signal generator means and said storage means for generating a pulse signal for controlling the fuel injection for each of the cylinders, each of said pulse signals having a leading edge which corresponds to the leading edge of a respective one of the pulse outputs of the timing signal generator means and a duration in accordance with said digital signal pulse count.

2. The system of claim 1 wherein said timing signal generator means comprises a digital sequencer, means responsive to the engine ignition for generating a series of pulses coincidental with the firing time of each of said cylinders for driving said sequencer, and means responsive to the rotation of the engine distributor for generating pulses for resetting said sequencer to identify the pulse output thereof with each of the engine cylinders.

3. The system of claim 1 wherein said control signal generator means comprises a binary comparator for each of said cylinders, said binary comparators receiving said digital signal, a clock pulse generator, and a binary counter for each of said comparators, and a control flipflop for generating a fuel injection control pulse for each of said cylinders, said control flipflops being driven to a first state in response to the respective outputs of said timing signal generator and to a second state in response to the respective outputs of said binary comparators, said counters being reset in response to outputs from their associated flipflops when said flipflops are driven to the second state.

4. The combination of claim 1 and additionally including means for recirculating the engine exhaust gas to the engine intake manifold under predetermined engine operating conditions, said last mentioned means including a valve for interconnecting the exhaust and the intake manifold, means for sensing engine temperature, intake manifold vacuum, engine RPM and whether or not the engine transmission is in high gear, and logical control means responsive to a predetermined combination of said sensed conditions for actuating said valve.

5. The combination of claim 1 and additionally including means for inhibiting the operation of the engine fuel pump in the event the engine fails to start a predetermined time after the ignition switch is actuated.

6. The combination of claim 5 wherein said means for inhibiting the operation of the fuel pump includes a time delay circuit, the timing cycle of which corresponds to said predetermined time and is initiated by said ignition switch, means for sensing engine operation and generating a signal indicative thereof, and electronic logic gating means responsive to the outputs of said delay circuit and said sensing means for providing a control signal to effect operation of the fuel pump during said timing cycle and to terminate such operation in the event the sensing means output indicates non-operation of the engine at the end of the timing cycle of the delay circuit.

7. The system of claim 1 and additionally including cold start enrichment means for increasing the duration of said pulse signal in inverse relationship to engine temperature.

8. The system of claim 1 and additionally including hot start enrichment means for augmenting the duration of said pulse signal by a fixed amount for a fixed period immediately after engine starting.

9. The system of claim 1 and additionally including an engine starter switch and means for feeding a signal from said starter switch to said control signal generator means to control said control signal generator whereby the pulse control signal output thereof has a predetermined fixed pulse width while said starter switch is being actuated.

10. The system of claim 1 means for updating the digital signal in response to said parameters at intervals equal to or less than the intervals between the injection of fuel to each of said engine cylinders.

11. The system of claim 1 wherein said means for generating an updated digital signal includes means for updating the output provided thereby in response to intake manifold vacuum and engine temperature 1-8 times for the injection of fuel to each engine cylinder.

12. In an internal combustion engine having a fuel injector for injecting fuel into each of the cylinders thereof, means for generating a pulse control signal for controlling the operation of each of said fuel injectors comprising:

a timing signal generator comprising means for sensing the ignition spark for each of said cylinders and generating a series of pulses in accordance therewith, sequencer means for providing pulses on separate lines in sequence in response to said series of pulses, means for synchronizing the operation of said sequencer means whereby the output on each of said lines corresponds with the opening of the intake valve of a separate one of said cylinders, means for generating an analog signal inversely proportional to engine intake manifold vacuum, means for generating an analog signal inversely proportional to engine temperature, means for summing said analog signals to provide a single analog signal, analog/digital converter means for converting said single analog signal to a digital signal, storage means for storing said digital signal, said analog/digital converter means including means for periodically generating an updated digital signal in accordance with a more current value of the analog signal and providing said updated signal to said storage means, and control signal generator means responsive to the outputs of said timing signal generator means and said storage means for generating said pulse control signals, said pulse control signals having leading edges corresponding to the opening time of each of the cylinder intake valves and pulse widths in accordance with said digital signal, for establishing the duration of the valve opening times.

13. The combination of claim 12 wherein said timing signal generator sensing means comprises a sensor for sensing the engine distributor output and said means for synchronizing the operation of the sequencer means comprises a second sensor for generating a pulse corresponding to a predetermined rotational position of the engine for resetting the sequencer means.

14. The combination of claim 12 wherein said control signal generating means comprises a binary counter and a binary comparator for each of said cylinders, means for providing clock pulses to said counters, the outputs of said digital signal generating means being fed to each of said comparators along with the output of the associated one of said counters, and a flipflop for generating each of the cylinder fuel injection control signals, each of said flipflops being set in response to a respective one of the outputs of the sequencer means and being reset in response to an output of a respective one of said comparators indicative of correspondence between the signals fed thereto, each of said counters being reset in response to the "reset" output of a respective one of said flipflops.

15. The combination of claim 12 and additionally including means for recirculating the engine exhaust gas to the engine intake manifold under predetermined engine operating conditions, said last mentioned means including a valve for interconnecting the exhaust and the intake manifold, means for sensing engine temperature, intake manifold vacuum, engine RPM and whether or not the engine transmission is in high gear, and logical control means responsive to a predetermined combination of said sensed conditions for actuating said valve.

16. The combination of claim 12 and additionally including means for inhibiting the operation of the engine fuel pump in the event the engine fails to start a predetermined time after the ignition switch is actuated.

17. The combination of claim 16 wherein said means for inhibiting the operation of the fuel pump includes a time delay circuit, the timing cycle of which corresponds to said predetermined time and is initiated by said ignition switch, means for sensing engine operation and generating a signal indicative thereof, and electronic logical gating means responsive to the outputs of said delay circuit and said sensing means for providing a control signal to effect operation of the fuel pump during said timing cycle and to terminate such operation in the event the sensing means output indicates non-operation of the engine at the end of the timing cycle of the delay circuit.

18. The combination of claim 12 wherein said means for generating a digital signal comprises analog data generator means for generating a voltage inversely proportional to intake manifold vacuum and inversely proportional to engine temperature and analog/digital converter means for converting said voltage to digital form.

19. The combination of claim 18 where said analog/digital converter means comprises means for providing a reference voltage, a comparator for comparing the voltage output of the analog data generator means with said reference voltage, a clock pulse source, a binary counter which counts the output of said clock pulse source and logical gating means for providing a reset pulse to said counter in response to a signal from said comparator indicating coincidence between the analog data generator means and the reference voltage, the count in said counter immediately prior to reset thereof representing the voltage output of the data generator means.

20. The combination of claim 19 and additionally including a storage register for receiving the output of said counter immediately prior to reset of said counter, the digital signal stored in said storage register being fed to said control signal generator means to determine the duration of the control pulse output thereof.

21. The combination of claim 12 and additionally including hot start enrichment means for augmenting the duration of said pulse control signal by a fixed amount for a predetermined period immediately following starting of the engine.

22. The combination of claim 12 and additionally including an engine starter switch and means for feeding a signal from said starter switch to said control signal generator means to provide a control therefor whereby the pulse control signals have a predetermined fixed pulse width while the starter switch is being actuated.

23. The combination of claim 12 and additionally including means for updating the digital signal in response to intake manifold vacuum and temperature at intervals equal to or less than the intervals between the injection of fuel to each of the engine cylinders.

24. The combination of claim 23 wherein said updating means comprises means for updating the digital signal 1-8 times for each injection of fuel to said engine cylinders.

25. An electronic system for controlling fuel injection into the cylinders of an internal combustion engine, comprising:

timing signal generator means for generating a series of pulses in sequence, the leading edge of each of said pulses corresponding to the opening of the intake valve of one of the engine cylinders respectively, said timing signal generator means comprising a digital sequencer, means responsive to the engine ignition for generating a series of pulses coincidental with the firing time of each of said cylinders for driving said sequencer, means responsive to the rotation of the engine distributor for generating pulses for resetting the sequencer to identify the pulse output thereof with each of the engine cylinders, means for generating a series of pulses in accordance with actuation of the engine throttle, and means for coupling said series of pulses to said sequencer prior to the starting of the engine for use in priming said engine, means for generating a digital pulse count signal which varies with preselected engine parameters comprising analog data generator means for generating a voltage representing predetermined optimum fuel injection time durations for said engine, said voltage being inversely proportional to intake manifold vacuum and engine temperature and means for converting said voltage to said digital pulse count signal, and control signal generator means responsive to the outputs of said timing signal generator means and said digital signal for generating a pulse signal for controlling the fuel injection for each of the cylinders, each of said pulse signals having a leading edge which corresponds to the leading edge of a respective one of the pulse outputs of the timing signal generator means and a duration in accordance with said digital signal pulse count.

26. In an internal combustion engine having a fuel injector for injecting fuel into each of the cylinders thereof, means for generating a pulse control signal for controlling the operation of each of said fuel injectors comprising:

a timing signal generator comprising means for sensing the ignition spark for each of said cylinders and generating a series of pulses in accordance therewith, sequencer means for providing pulses on separate lines in sequence in response to said series of pulses, means for synchronizing the operation of said sequencer means whereby the output on each of said lines corresponds with the opening of the intake valve of a separate one of said cylinders, means for priming the engine comprising means for generating a pulse train in response to movement of the engine throttle and gating means for feeding said pulse train to said sequencer means as a drive signal therefor prior to the starting of the engine, means for generating an analog signal representing predetermined optimum fuel injection time durations for said engine and which signal is inversely proportional to engine intake manifold vacuum and inversely proportional to engine temperature, means for converting said analog signal to a digital signal, and control signal generator means responsive to the outputs of said timing signal generator means and said means for generating a digital signal for generating said pulse control signals, said pulse control signals having leading edges corresponding to the opening time of each of the cylinder intake valves and pulse widths in accordance with said digital control signal, for establishing the duration of the valve opening times.

* * * * *